Nov. 11, 1969 G. WINSTEL ET AL 3,478,215

OPTICAL-ELECTRONIC SEMICONDUCTOR UNITARY DEVICE COMPRISING LIGHT TRANSMITTER, LIGHT RECEIVER, AND CONNECTING LIGHT CONDUCTOR OF CHROMIUM DOPED GALLIUM ARSENIDE

Filed Oct. 31, 1966 2 Sheets-Sheet 1

United States Patent Office 3,478,215

Patented Nov. 11, 1969

3,478,215

OPTICAL-ELECTRONIC SEMICONDUCTOR UNITARY DEVICE COMPRISING LIGHT TRANSMITTER, LIGHT RECEIVER, AND CONNECTING LIGHT CONDUCTOR OF CHROMIUM DOPED GALLIUM ARSENIDE

Gunter Winstel, Klaus Mettler, Karl-Heinz Zschauer, and Horst Pelka, Munich, Germany, assignors to Siemens Aktiengesellschaft, a corporation of Germany Filed Oct. 31, 1966, Ser. No. 590,706

Claims priority, application Germany, Nov. 4, 1965, S 100,363; Sept. 30, 1966, S 106,286

Int. Cl. H01j *31/50*

U.S. Cl. 250—211 5 Claims

ABSTRACT OF THE DISCLOSURE

A light transmitter comprising a tin-zinc alloyed gallium arsenide luminescence diode and a light receiver comprising a silicon photodiode are optically and mechanically connected by a light conductor comprising a chromium doped semi-insulated gallium arsenide crystal.

The present invention relates to a semiconductor device. More particularly, the invention relates to optical-electronic semiconductor systems of the type in which a first semiconductor component which acts as a transmitter producing optical radiation, e.g. a photo-emissive diode, and a second semiconductor component which acts as a receiver sensitive to that radiation, e.g. a photo-sensitive diode, are connected together by an optical link L. This optical link should have the highest possible optical coupling factor, and the best possible electrical insulating properties, whilst at the same time the mechanical coupling between transmitter and receiver should be stable within a temperature range extending from about −55° C. to +125° C.

The provision of a high optical coupling factor not only requires that the light emission from the transmitter should be of highest possible intensity, but also that it should be well matched to the spectral sensitivity of the receiver, and should be coupled with the lowest possible absorption, reflection and total internal reflection losses in the light path. However, the need for electrical decoupling between transmitter and receiver requires the use of an optical link having appropriate insulating properties, the required high-intensity of the transmitted light being obtained by the use of correspondingly high currents in a photo-emissive diode.

At the present time, the requirement for spectral matching which is analogous to frequency tuning in communications technology is best satisfied by the use of gallium arsenide for the transmitter material, and silicon for the receiver material. However, other combinations of materials may be found to be at least equally suitable in this context.

The light losses occurring through absorption, reflection and total internal reflection substantially are determined by the material chosen for the optical link that provides the electrical insulation; in particular the losses due to total internal reflection at the boundary surfaces between the optical link and the semiconductor components, are dependent upon the refractive index $n_L$ of the optical link relative to air, that is upon the relative refractive index of the optical link as compared to the semiconductor materials. Where the transmitter is a gallium arsenide photo-emissive diode A, and the receiver is a silicon diode B, their refractive indices are high ($n_A=n_{GaAs}\approx3.53$ and $n_B=n_{Si}\approx3.5$), so that the total internal reflection losses in particular can be substantially reduced by the use of a highly-refractive optical link L.

Optical-electronic semiconductor systems of this kind are known in principle (e.g. see Biard et al.: Proc. IEEE, 1964, vol. 52, No. 12, pages 1529–1536). Mention should be made of the use of glasses containing lead or selenium as an optical link L between a gallium arsenide photo-emissive diode transmitter A, and a silicon photo-sensitive diode as receiver B, these glasses having a refractive index $n_L\approx1.8$–$1.9$ and $n_L\approx2.4$–$2.6$ respectively. However, the relative refractive indices of these optical link materials differ radically from that of the semiconductor material of the transmitter and receiver (by about 50% or more), so that the light losses, in particular those due to total internal reflection, are still very considerable.

Furthermore, the electrical insulating effect of optical links in the form of glasses containing lead or selenium drops appreciably with increasing temperature, even in the normal operating temperature region.

The principal object of the present invention is to provide a new improved opto-electronic semiconductor device. The opto-electronic semiconductor device of the present invention eliminates the disadvantage of considerable light losses due to total reflection of the known devices. The light losses due to total reflection are eliminated in the opto-electronic semiconductor device of the present invention. The opto-electronic semiconductor device is efficient, effective and reliable in operation and is simple in structure.

The invention consists in an optical-electronic semiconductor system comprising a semiconductor transmitter and a semiconductor receiver linked together in a mechanically stable fashion by an optical link of semiconductor material having high resistance (i.e. substantially free of any free charge carriers) and low-absorptivity, the refraction index of said optical link semiconductor material for the transmitted light deviating by less than 40%, preferably less than 20%, from the refractive indices of said semiconductor transmitter and receiver, at least at the boundary regions of the link with the transmitter and the receiver, so that losses due to total internal reflection in particular are substantially avoided.

Advantageously, the optical link is in the form of a semi-insulating semiconductor material, and where the transmitter is of gallium arsenide and the receiver of silicon material, the link may be semi-insulating gallium arsenide.

The term "semi-insulating" can be explained in the following manner:

The lowest electrical conductivity, i.e. the highest electrical resistance, is exhibited by the purest semiconductor material, but technical and economic considerations make it difficult to achieve such a state in some semiconductor materials. As far as the electrical conductivity or electrical resistance is concerned, this desired purest state can be closely approximated in an economical manner by effecting at least partial compensation of the parasitic (impurity) charges which are always present. This kind of compensation is achieved by the deliberate incorporation of alien atoms, e.g., atoms which act as traps for free charge carriers. A semiconductor material which is *not* of maximum purity, but which has been compensated in this way to give the highest possible electrical resistance, is termed semi-insulating.

Thus, by appropriate choice of materials, it is possible to make the refarctive index of the optical link the same as that of one of the semiconductor components, preferably the transmitter, for example, by making them both of gallium arsenide, in which case it is then only necessary to adopt the refractive indices of the optical link and the receiver to each other.

The absorption losses occur chiefly in the optical link particularly if this is made of the same basic material as the transmitter. It should therefore be ensured that at least in the optical link the absorption coefficient for the light used is sufficiently small about <20 cm.$^{-1}$. The absorption coefficient can be adjusted by doping the optical link L.

A semi-insulating gallium arsenide, i.e. one which is as high-ohmic as possible and at the same time of low absorptivity, can be achieved, for example, by doping gallium arsenide with some $10^{16}$ chromium atoms per cm.$^3$. The absorption losses are the lower the longer the wavelength of the radiation emitted by the gallium arsenide photo-emissive diode. Particularly suitable is gallium arsenide photo-emissive diode, the light-producing pn-junction of which has been produced by the alloying in of a zinc-tin pellet, preferably having the composition $Zn/Sn \approx 10^{-2}-10^{-1}$, to give spectral emission peaks at around $\lambda \approx 0.98\mu$. The absorption coefficient of the semi-insulating chromium doped gallium arsenide optical link material for this light amounts to only about $\alpha \approx 5$ cm.$^{-1}$ (see C. E. Jones and A. R. Hilton, J. Electrochem. Soc., vol. 113, May 1966, pages 504, 505). For comparison, with light from a conventional diffused gallium arsenide photo-emissive diode ($\lambda \approx 0.9\mu$) the absorption coefficient would be about $\alpha \approx 50$ cm.$^{-1}$, about 10 times larger (see W. N. Carr, IEEE Trans. on El. Dev., ed. No. 10, October 1965, pages 531 to 535).

Chromium doped gallium arsenide not only has low absorptivity at around $1\mu$, but is also extremely high-ohmic (around $10^8\Omega$ cm.) and is therefore particularly suitable as a material for a high break-down resistance optical link.

Since, in this case, the transmitter A and optical link L of the optical-electronic semiconductor system are made of the same basic material, namely gallium arsenide, it is extremely simple to effect a mechanically stable bond between the two, for example by the use of epitaxial techniques. The receiver B can be stably attached to the optical link L by cementing.

The aforementioned advantage of extremely low absorption in the optical link Li also of significant because of the fact that the cement used between optical link L and receiver B may be a source of light losses, but these unavoidable losses can be tolerated because of the very small losses encountered along the path up to this cement layer.

By way of a cementing agent between optical link L and receiver B, it is possible, without suffering excessive absorption losses, to employ approximately $1\mu$ thick layers of low melting-point glass, and these may now be permitted a certain electrical conductivity. A cementing glass K of this kind can in particular contain arsenic sulphide $As_4S_4$ or arsenic selenide $As_2Se_3$, which increases the refractive index and thus reduces the reflection losses. With layer thicknesses of less than $\lambda/2$, i.e. less than around $0.5\mu$ organic adhesives can be used without substantial disadvantage.

A reduction in the absorption losses can also be brought about by incorporating other $A_{III}$-$B_V$ compounds in the material of the photo-emissive diode and/or of the aptical link, in fact by the inclusion in the photo-emissive diode of components which reduce the band interval, in the case of gallium arsenide, at least one of the compounds indium antimonide, indium arsenide, gallium antimonide or indium phosphide, for example, and/or by the inclusion in the optical link of components which enlarge the band interval, in this case of gallium arsenide, at least one of the compounds aluminum phosphtide, aluminum arsenide, gallium phosphide or aluminum antimonide, for example.

In order that the present invention may be readily carried into ecect, it will now be described with reference to the accompanying drawings, wherein.

Figure 1:
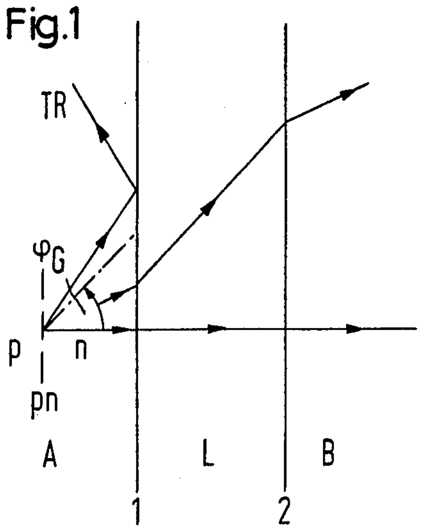
FIGURE 1 is a theoretical diagram.

In FIGURES 1, the ray path in an optical-electronic semiconductor system is schematically indicated. For the sake of clarity, it has been assumed that there is a point junction pn formed between p-type and n-type zones p and n in a photo-emissive diode A that is connected via an optical link L to a semconductor recever B, 1 and 2 being the boundary surfaces between A and L on the one hand and L and B on the other. The loss due to total internal reflection is indicated by TR.

The light rays obey the refraction law $$\sin \vartheta = n \sin \varphi$$

where $n$=relative refractive index;

$$\sin \varphi_G = 1/n$$

where $\varphi_G$=limiting angle of total internal reflection $$(n>1)$$

The optical coupling factor $\eta$ (i.e. the quotient of the intensity $J_B$ received in B and the intensity $J_A$ emitted from the pn-junction in A) is given by $$\eta \sim \eta_1 \cdot \eta_2$$

(The absorption losses are not included here.)

In this context, $\eta_1$ is by good approximation the product of the transmissivity $T_1$ at the boundary surface 1 and a factor $F_{TR}$ which allows for the fact that because of total internal reflection only light rays falling within the cone described by the apertural angle $2\varphi_G$, pass the boundary surface 1.

Fresnel's formulae give the transmissivity as $$T_{\parallel} = \frac{4n^2 \cos \vartheta \cdot \sqrt{n^2 - \sin^2 \vartheta}}{(\cos \vartheta + \sqrt{n^2 - \sin^2 \vartheta})^2 \cdot (\cos \vartheta \cdot \sqrt{n^2 - \sin^2 \vartheta} + \sin^2 \vartheta)_z}$$

$$T_{\perp} = \frac{4 \cos \vartheta \cdot \sqrt{n^2 - \sin^2 \vartheta}}{(\cos \vartheta + \sqrt{n^2 - \sin^2 \vartheta})^2}$$

$$T = \tfrac{1}{2}(T_{\parallel} + T_{\perp})$$

With the aid of the refraction law $T_{\parallel}$ $T_{\perp}$ and T can be represented also as a function of the angle of incidence $\varphi$.

Figure 2:
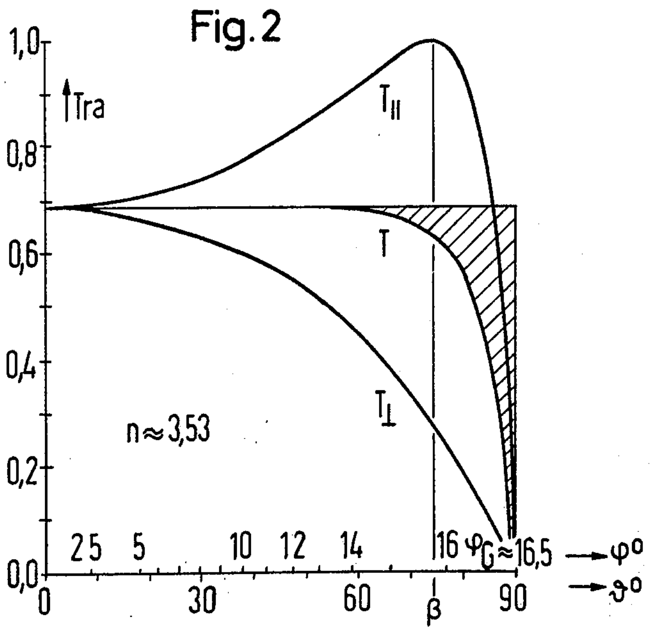
FIGURES 2 and 3 are graphs giving an indication of the advantages obtained, in particular with regard to total reflection losses, by the matching of the refractive indices in an embodiment of the invention.

In FIGURE 2, the transmissivity T*ra* is plotted for the case in which $n=3.53$ (this corresponds to a boundary between gallium arsenide and air). It will be seen that T first exhibits a marked drop at angles $>\beta$=Brewster angle. In other words, by close approximation the transmissivity can be called independent of angle and taken as $T(\varphi \approx \vartheta \approx 0°)$; the error in this approximation is indicated by the ratio of the shaded area (FIGURE 2) to the complete rectangle of height $T(\varphi \approx \vartheta \approx 0°)$ and becomes smaller as $n \rightarrow 1$, since $\beta \rightarrow 90°$. This gives $$T \approx T(\varphi \approx \vartheta \approx 0°) = \tfrac{1}{2}[T_{\parallel}(\varphi \approx \vartheta \approx 0°) + T_{\perp}(\varphi \approx \vartheta \approx 0°)] = \frac{4n}{(n+1)^2} \sim \frac{n}{(n+1)^2} = \frac{1/n}{(1/n+1)^2}$$

The factor $F_{TR}$ is formed by the quotient of the $2\varphi_G$ solid angle (usable light beam as determined by total internal reflection) and the overall spherical area. Using the formulae for total internal reflection we get $$F_{TR} = \frac{n_1 - \sqrt{n_1^2 - 1}}{2n_1} \sim \frac{n_1 - \sqrt{n_1^2 - 1}}{n_1}; \quad n_1 = \frac{n_A}{n_L}$$

Since at the boundary 2, because $n_L \lessapprox n_B$, there is no total internal reflection and since $n_A = n_{GaAs} \approx n_{Si} = n_B$ $$(\text{i.e. } n_2 = n_L/n_B \approx 1/n_1)$$

we get for the optical coupling factor the expression $$\eta(n_1) \sim \frac{n_1 - \sqrt{n_1^2 - 1}}{n_1} \cdot \frac{n_1}{(n_1+1)^2} \cdot \frac{n_2}{(n_2+1)^2} \approx n_1 \frac{n_1 - \sqrt{n_1^2 - 1}}{(n_1+1)^4}$$

Figure 3:
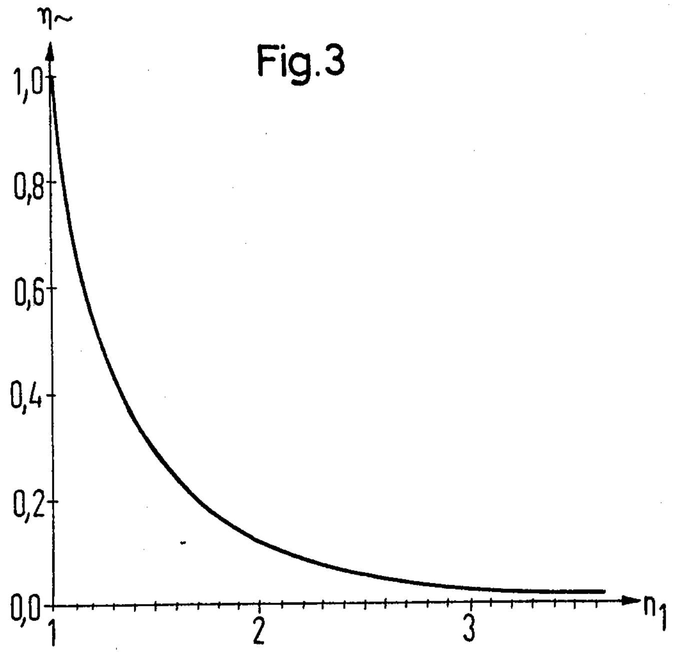

In FIGURE 3, the behaviour of $\eta$ ($n_1$) is plotted. It can clearly be seen that for an optical-electronic system in accordance with a preferred feature of the invention ($n_1<1.2$) the optical coupling factor $\eta$ is substantially higher than where optical links are of a glass containing lead ($n_L\approx1.8$, i.e. $n_1\approx1.4$) or of a glass containing selenium ($n_L\approx2.5$, i.e. $n_1\approx1.95$), or in the case where air is used, ($n_1\approx3.5$).

Figure 4:
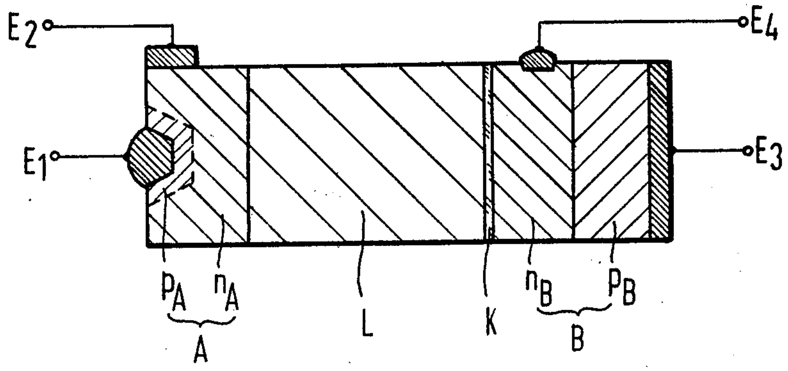
FIGURE 4 is a schematic cross-section through an exemplary embodiment.

FIGURE 4 shows an exemplary embodiment of an optical-electronic semiconductor system in accordance with the invention.

In this embodment, the system is in the form of a rod-shaped arrangement, in which a zinc-tin alloyed gallium arsenide photo-emissive diode transmitter A is provided with electrodes $E_1$ and $E_2$ making ohmic connection to the p- and n-zones $p_A$ and $n_A$ of the photo-emissive diode A.

A highly refractive optical link of semi-insulating semiconductor material which has low absorptivity is provided by the epitaxially applied chromium doped gallium arsenide region L, onto which a photo-sensitive silicon diode receiver B is cemented by a thin layer K of low melting-point glass. The photo-sensitive diode is provided with electrodes $E_3$ and $E_4$ making ohmic connection with the p- and n-zones $p_B$ and $n_B$ of the photo-sensitive diode B.

The doping of the link L is such that absorption losses are reduced, and the semiconductor materials of the photo-emissive diode and the link may each incorporate an $A_{III}$-$B_V$ compound to reduce absorption losses, in the manner described above.

We claim:

1. An optical-electronic semiconductor device, comprising a light transmitter comprising a tin-zinc alloyed gallium arsenide luminescence diode;
   a light receiver comprising a silicon photodiode; and
   a light conductor optically and mechanically connecting said light transmitter and said light receiver, said light conductor comprising a chromium doped, semi-insulated gallium arsenide crystal.

2. An optical-electronic semiconductor device, as claimed in claim 1, wherein the light conductor is deposited by epitaxy upon the light transmitter.

3. An optical-electronic semiconductor device, as claimed in claim 1, wherein at least one of the tin-zinc alloyed gallium arsenide luminescence diode and the light conductor includes an $A_{III}$-$B_V$ compound.

4. An optical-electronic semiconductor device, as claimed in claim 1, further comprising cement between the light receiver and the light conductor affixing said receiver and conductor together on the side opposite that of the luminescence diode.

5. An optical-electronic semiconductor device, as claimed in claim 4, wherein the cement between the light conductor and the light receiver comprises an approximately 1 $\mu$m thick layer of a glass containing arsenic sulphide or arsenic selenide.

References Cited

UNITED STATES PATENTS

| | | | |
|---|---|---|---|
| 3,229,104 | 1/1966 | Rutz | 250—217 X |
| 3,315,176 | 4/1967 | Biard | 250—217 X |
| 3,354,316 | 11/1967 | Deverall | 250—217 |
| 3,358,146 | 12/1967 | Ing et al. | 250—217 X |
| 3,369,132 | 2/1968 | Fang et al. | 250—211 X |

RALPH G. NILSON, Primary Examiner

T. N. GRIGSBY, Assistant Examiner

U.S. Cl. X.R.

250—217; 317—127, 235